Figure 1:
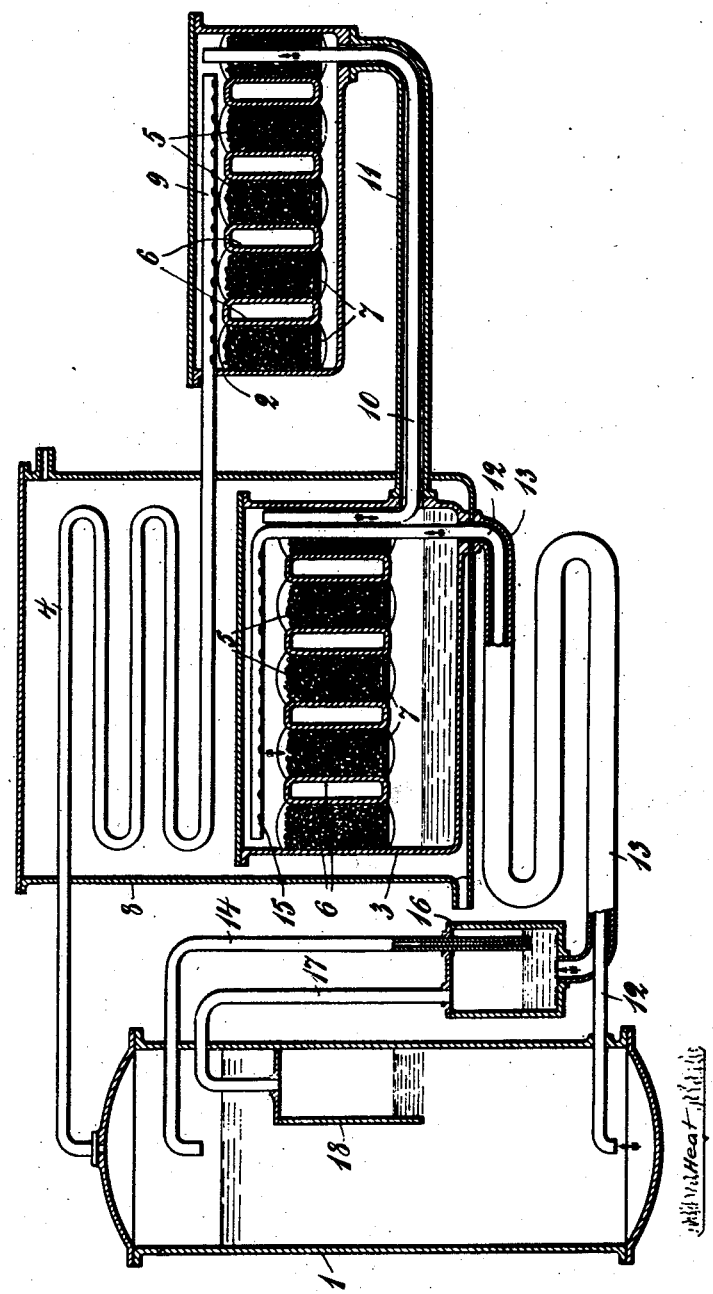

April 3, 1928.

B. C. VON PLATEN ET AL 1,664,471

REFRIGERATION

Filed March 6, 1924

2 Sheets-Sheet 1

Inventors
B. C. von Platen
C. G. Munters
By Marks & Clerk

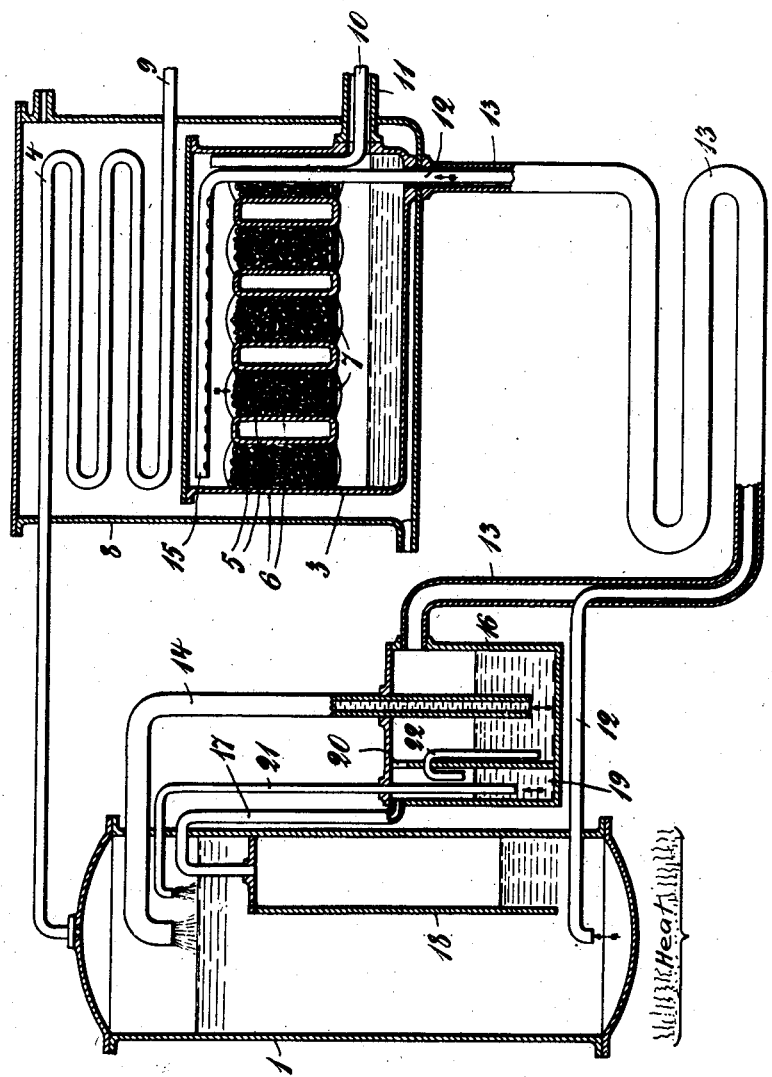

Patented Apr. 3, 1928.

1,664,471

UNITED STATES PATENT OFFICE.

BALTZAR CARL von PLATEN, OF YSTAD, AND CARL GEORG MUNTERS, OF DALA-JARNA, SWEDEN, ASSIGNORS, BY MESNE ASSIGNMENTS, TO ELECTROLUX SERVEL CORPORATION, A CORPORATION OF DELAWARE.

REFRIGERATION.

Application filed March 6, 1924, Serial No. 697,418, and in Sweden March 8, 1923.

This invention relates to refrigeration and more particularly to refrigeration of the absorption type. The invention relates, still more particularly, to means for circulating absorption liquid in absorption refrigerating apparatus and novel processes carried out by such means. In view of the nature of operation of such means, it is herein termed "pump". The invention has for its principal object to provide such a pump having no mechanically moving parts and operated automatically by gases developed within the refrigerating apparatus.

The invention will be described with reference to the accompanying drawing, in which Fig. 1 shows an absorption refrigerating apparatus, provided with a circulating pump in accordance with this invention. Fig. 2 shows a modified form of the circulating pump.

The refrigerating apparatus consists of a generator 1, an evaporator 2, an absorber 3 and a condenser 4, which are connected with one another so as to form a hermetically closed circulating system. The generator 1 contains the cooling agent, for instance ammonia, dissolved in water, whereas the evaporator 2 and the absorber 3 contain in addition to the cooling agent in a gaseous condition also a gas which is inert with respect to the cooling agent, as for instance hydrogen, and which serves the purpose of equalizing the pressure in the apparatus. The evaporator and the absorber further contain a porous or fibrous material 5, as for instance iron-wool or cuttings, serving as a means for distributing the liquid entering the said receptacles, over as large a surface as possible. The said material is disposed in a number of tubular cells 6, which communicate with one another at the top and at the bottom and which are provided with perforated bottoms 7. The condenser coil 4, connecting the gas space of the generator with the evaporator, is placed together with the absorber 3 in a cooling water tank 8. The end of the tubular conduit entering the evaporator forms a perforated distributor 9. The evaporator 2 and the absorber 3 communicate at the top and at the bottom respectively by means of pipes 10 and 11 forming together a heat exchanger, the pipe 10 being located inside the pipe 11.

The generator and the absorber are connected with one another by means of pipes 12 and 13 and a riser pipe 14, so as to form a closed circulating system for the absorption liquid. The pipe 12 opens at one end at the bottom of the generator and at the other end at the top of the absorber, the end of the pipe entering the absorber forming a perforated distributor 15. The pipe 12 is located inside the pipe 13 in such a manner as to form together with the latter a heat-exchanger. The circulating system provided for the liquid further includes a pressure vessel 16 connected with the lower end of the riser pipe 14, the upper part of said vessel communicating through a pipe 17 with a pressure reservoir 18 located in the liquid chamber of the generator. The pressure vessel 16 is located below the liquid level in the absorber so as to allow the liquid to flow into the said vessel and to fill it partly. The liquid will then rise also in the pipe 14 to a level approximately equal to the liquid level in the absorber.

The apparatus operates as follows. On heating the generator 1, the ammonia will be separated from the liquid and caused to flow from the generator through the condenser 4 to the evaporator 2. The ammonia is condensed into liquid in the condenser 4 and, consequently, it reaches the cooler in a liquid state. As the ammonia flows down into the cells 6, it spreads over the porous material 5 and evaporates the vapors then expanding and mixing with the hydrogen. As the ammonia thus evaporates and diffuses into the hydrogen, heat is absorbed from the surroundings of the evaporator. Because of the ammonia vapors being heavier than the hydrogen, the mixture of ammonia and hydrogen will descend through the pipe 11 into the lower part of the absorber 3, whereby it is brought in contact with the liquid flowing through the absorber. The liquid dissolves the ammonia, but not the hydrogen and, consequently, the ammonia will be separated out, whereas the hydrogen will rise through the absorber and will return through the pipe 10 to the evaporator 2, where it will again mix with fresh ammonia vapors. An automatic circulation of the inert gas through the evaporator and the absorber is thus maintained substantially on account of the difference of the specific weights of the different gases.

The liquid circulation takes place in such a manner that the liquid in the absorber, which is concentrated with ammonia, is conveyed into the generator through the conduits 13 and 14, whereas the liquid which is poor in ammonia is supplied to the absorber through the conduit 12, through which the liquid flows owing to the fact that the liquid level in the generator is permanently somewhat higher than the level of the distributor 15 in the absorber.

The said circulation is effected in the following way. Part of the gas developed in the generator collects in the pressure reservoir 18, wherein the pressure will thus rise above the pressure in the gas space of the generator to an amount corresponding to the pressure head between the level of the liquid in the generator proper and the level of the liquid in the pressure reservoir 18. The reservoir 18 is located inside the generator in such a way that the super-pressure produced in the same may exceed the pressure head of the liquid column in the riser pipe 14. Owing to this fact the liquid in the pressure vessel 16 will be displaced and the gas will thus finally escape through the riser pipe 14 and, the liquid column contained in said pipe will be forced out and passed into the upper part of the generator. In order to prevent the gas from escaping through the riser pipe without raising the liquid, the pipe should have a relatively small inner width, so that the liquid will be pushed up through the pipe in the form of a solid column. As soon as the liquid contents of the riser pipe has been emptied into the generator, the gas pressures in the generator and the pressure reservoir 18 will be equalized, and liquid will then again be supplied to the pressure vessel 16 thus causing the level of liquid in the pressure vessel to rise somewhat above the mouth of the riser pipe. As a consequence, the lower part of the riser pipe 14 will again be filled up with liquid to a level corresponding to the liquid level in the absorber, and the process described will then be repeated.

As mentioned above the riser pipe 14 must be relatively narrow in order to allow the liquid in the pipe to be actuated by the gas and to be raised in the form of a solid liquid column. Owing to this fact the capacity of the pump is rather limited. The modified form of the pump shown in Fig. 2 is devised with a view to increase the performance of the pump.

Provided in the pressure vessel 16 there is a regulating chamber 19 communicating with the gas chamber of the pressure vessel through an opening 20. Said regulating chamber may also be formed by a receptacle, separated from the pressure vessel but communicating with the pressure reservoir 18. Projecting into the regulating chamber 19 is a pressure equalizing pipe 21, the upper end of which opens into the gas chamber of the generator immediately above the liquid surface, and the lower end of which opens into the lower part of the chamber 19, preferably at a level that is somewhat higher than the lower end of the riser pipe 14. In this case the pipe 13 is connected to the gas chamber of the pressure vessel 16. The pipe 13 is further extended downwards to such an extent as to be able to hold a liquid column which is somewhat higher than the riser pipe 14. The pressure vessel 16 is arranged below the liquid level of the absorber so as to be automatically filled with liquid through the pipe 13 upon the pressure being equalized. After the vessel 16 has been thus filled up to a certain level, liquid will flow also into the regulating chamber 19 through a siphon 22. The pressure reservoir 18 in the generator should be so arranged as to be capable of producing a super-pressure corresponding to the pressure head of a liquid column equal to the height of the riser pipe 14.

This pump will operate in the following way. After the pressure vessel 16 and the regulating chamber 19 have been filled with liquid the pressure produced in the pressure reservoir 18 will cause the liquid to be forced up through the riser pipe 14 and the pressure equalizing pipe 21, while at the same time the liquid will sink in the pipe 13, the liquid columns in the pipes 14 and 21 being balanced by the pressure head of the liquid in the pipe 13 and the absorber 3. According as the gas is being developed in the pressure reservoir 18, the pressure increases and, as a consequence, the liquid will finally flow in a continuous stream into the generator through the pipes 14 and 21. At the same time the liquid level in the pressure vessel 16 and the regulating chamber 19 is sinking, until the surface of the liquid reaches the lower mouth of the pipe 21, when the gas escapes to the generator through the pipe 21. The pipe 21 is preferably so narrow that capillary forces and surface tensions will prevent the gas from forcing its way through the liquid in the pipe. The liquid column will therefore be forced out of the pipe and an open connection will be established between the gas chambers of the pressure vessel and the generator, whereby the difference between the pressures in the pressure vessel and the generator is equalized. Consequently, the liquid will now again flow into the vessel 16 from the absorber through the pipe 13, while the gas chamber of the pressure vessel still remains in connection with the gas chamber of the generator through the pipe 21. When the liquid level in the pressure vessel 16 reaches above the upper end of the siphon 22, the regulating chamber 19 will also be filled with liquid causing the gas chambers of the pressure vessel and the generator to be cut off from one another by a column of liquid in the pipe 21. Said liquid column will gradually rise according as the pressure in the pressure reservoir 18 is being increased, and at the same time the liquid gradually rises in the pipe 14. The operation of the pump will then continue in the manner described, while the pressure is being periodically and alternatively increased and equalized respectively. Evidently, the performance of the pump is not limited in this case by the size of the riser pipe 14 as the latter may obtain any cross-sectional area desired and a pump of this construction may therefore be used for any performance practically required.

It will be understood from the foregoing description that a pump constructed in accordance with Fig. 2 will obtain a longer operating period than a pump according to Fig. 1 and it will also be seen that this prolongation of the operating periods is due to the fact that the regulating chamber is not supplied with liquid, until the pressure vessel has been entirely filled up. Further, it should be observed that the pressure equalizing pipe 21 will also serve as a pumping pipe for a portion of the liquid. In view of this fact the riser pipe 14 may contingently be omitted, in case the pipe 21 alone would suffice for pumping the required amount of liquid. As compared with the arrangement according to Fig. 1, the modification last mentioned has the advantage that the pump will operate more regularly and with longer periods.

It is readily understood that the gas required for operating the pump may also be developed in the pressure vessel 16 itself by supplying heat to said vessel. The pressure reservoir 18 and the pipe 17 may then be dispensed with. In the last mentioned case the pressure vessel is preferably arranged in thermal connection with the generator so that the pump will be kept in operation by means of the heat supplied to the generator. The pressure vessel and the riser pipe may then preferably be located inside the liquid chamber of the generator.

We claim:

1. That improvement in the art of refrigerating through the agency of an absorption system including a generator containing a first body of absorption liquid and an absorber containing a second body of absorption liquid which consists in forming a third body of absorption liquid, generating a gas pressure reacting against the first body, the second body and the third body and causing movement of said third body between the absorber and generator due to said gas pressure.

2. That improvement in the art of refrigerating through the agency of an absorption system including a generator containing a first body of absorption liquid and an absorber containing a second body of absorption liquid, which consists in forming a third body of absorbing liquid, generating an excess of gas pressure above the generator gas pressure reacting against the first body, the second body and the third body and moving said third body into the generator under the influence of said excess of gas pressure.

3. Refrigerating apparatus comprising a generator, a condenser, an evaporator and an absorber forming a system, said system containing an absorption liquid, means to heat the absorption liquid, a pressure vessel in the system, a riser pipe extending from the lower portion of said vessel to the upper part of the generator, means in the system to conduct liquid from the absorber to the pressure vessel, means operative under the influence of the heat applied to the absorption liquid to develop an excess of gas pressure and means to impose said excess of gas pressure onto the contents of said vessel to force liquid supplied to said riser pipe from the absorber into the generator.

4. Apparatus according to claim 3 wherein the riser pipe is so narrow that gas will not pass through liquid within the pipe.

5. Refrigerating apparatus comprising a generator, a condenser, an evaporator, an absorber, an upwardly extending riser pipe opening into the upper part of the generator, means to form a pool of liquid at the lower end of said riser pipe, a conduit connecting the absorber with said pool, the arrangement being such that the riser pipe contains liquid, and pressure means to lower the surface of the pool, uncover the lower end of the riser pipe and force the liquid in the riser pipe through the same and into the generator.

6. Refrigerating apparatus comprising a generator, a condenser, an evaporator, an absorber, an upwardly extending riser pipe opening into the upper part of the generator, means to form a pool of liquid at the lower end of said riser pipe, a conduit connecting the absorber with said pool, the arrangement being such that the riser pipe contains liquid, means to produce an excess of gas pressure above the generator gas pressure against a column of liquid and means communicating said excess of gas pressure to the surface of the pool to uncover the lower end of the riser pipe and force the liquid in the riser pipe through the same and into the generator.

7. Refrigerating apparatus comprising a generator, a condenser, an evaporator, an absorber, an upwardly extending riser pipe opening into the upper part of the generator, means to form a pool of liquid at the lower end of said riser pipe, a conduit connecting the absorber with said pool, the arrangement being such that the riser pipe contains liquid, a pressure reservoir having a communication at the lower part thereof with the liquid space of the generator and situated below the level of liquid in the generator, means to produce gas in said pressure reservoir and means to conduct gas from said reservoir on to the surface of said pool.

8. Refrigerating apparatus comprising a generator, a condenser, an evaporator, an absorber, a pressure vessel, a pressure reservoir having a closed upper portion arranged within the generator and extending below the level of liquid therein, a conduit connecting the upper part of the pressure reservoir with the upper part of the pressure vessel, a conduit connecting the lower part of the pressure vessel with the upper part of the generator and a conduit connecting the absorber with the pressure vessel.

9. Refrigerating apparatus comprising a generator, a condenser, an evaporator, an absorber, an upwardly extending riser pipe opening into the upper part of the generator, means to form a pool of liquid at the lower end of said riser pipe, means to conduct liquid from said absorber to said pool and periodically acting pressure means to force liquid from said pool into said generator.

10. Refrigerating apparatus comprising a generator, a condenser, an evaporator, an absorber, an upwardly extending riser pipe opening into the upper part of the generator, means to form a pool of liquid at the lower end of said riser pipe, means to conduct liquid from said absorber to said pool, means to produce an excess of pressure above the generator gas pressure by an amount greater than the pressure of a column of liquid produced in the riser pipe by flow from the absorber, and means to apply said excess pressure to the pool to force liquid through the riser pipe.

11. Refrigerating apparatus comprising a generator, a condenser, an evaporator, an absorber, an upwardly extending riser pipe opening into the upper part of the generator, means to form a pool of liquid at the lower end of said riser pipe, means to conduct liquid from said absorber to said pool, means to produce an excess of pressure above the generator gas pressure by an amount greater than the pressure of a column of liquid produced in the riser pipe by flow from the absorber and means to apply said excess pressure to the pool to force liquid through the riser pipe and to periodically relieve the excess pressure.

12. The process of producing refrigeration which comprises expelling vapor from solution in absorption liquid in a generator, condensing the vapor, evaporating the condensed vapor in the presence of a pressure equalizing fluid, conducting the mixture of fluids thus formed to the presence of absorption liquid in an absorber, withdrawing a quantity of liquid from the absorber, producing an excess of pressure above the generator gas pressure, applying the excess pressure to the quantity of liquid withdrawn from the absorber to force the same into the generator, conducting absorption liquid from the generator to the absorber and conducting the pressure equalizing fluid from the absorber into the presence of the condensed vapor.

13. The process of producing refrigeration which comprises expelling vapor from solution in absorption liquid in a generator, condensing the vapor, evaporating the condensed vapor in the presence of a pressure equalizing fluid, conducting the mixture of fluids thus formed to the presence of absorption liquid in an absorber, periodically withdrawing liquid from the absorber and forming successive columns of the same, periodically producing an excess of pressure above the generator gas pressure, periodically releasing the excess pressure against said columns and thus forcing the columns into the generator, conducting absorption liquid from the generator to the absorber and conducting the pressure equalizing fluid from the absorber into the presence of the condensed vapor.

14. The process of producing refrigeration which comprises expelling vapor from solution in absorption liquid in a generator, condensing the vapor, evaporating the condensed vapor in the presence of a pressure equalizing fluid, conducting the mixture of fluids thus formed into the presence of absorption liquid in an absorber, withdrawing liquid from the absorber, forming a pool of said liquid, forming an excess of pressure above the generator pressure, applying the excess pressure formed to the pool to force liquid therefrom into the generator, reducing the pressure exerted on the pool to that of the generator when a certain amount of liquid has been forced therefrom into the generator and releasing the excess pressure, adding more liquid to the pool from the absorber at the reduced pressure, again forming an excess pressure to force liquid from the pool into the generator, while conducting absorption liquid from the generator to the absorber and conducting the pressure equalizing fluid from the absorber into the presence of the condensed vapor.

15. Refrigerating apparatus comprising a first vessel, a second vessel, an upwardly extending conduit having a lower opening within said first vessel and below the top thereof and having an upper opening in said second vessel at a higher level, a third vessel having a considerable lateral extent to contain an appreciable body of liquid, the arrangement being such that the level of liquid in said third vessel is above the level of liquid in said first vessel, a connection for flow of liquid from said third vessel to said first vessel and means to supply gaseous fluid to said first vessel.

16. Refrigerating apparatus comprising a first vessel adapted to receive gaseous fluid and liquid fluid from different sources and to deliver the two to a common receiving means, a second vessel constituting the receiving means wherein fluid passes out of solution to gaseous form, a conduit extending between the two vessels and having a lower opening within said first vessel below the top thereof and a higher opening in said second vessel and gas forming means and liquid retaining means constituting said different sources.

17. Refrigerating apparatus comprising a first vessel adapted to receive gaseous fluid and liquid fluid from different sources and to deliver the two to a common receiving means, a second vessel constituting the receiving means wherein fluid passes out of solution into gaseous form, a conduit extending upwardly from said first vessel to said second vessel and gaseous fluid forming means and liquid retaining means constituting said different sources.

18. That improvement in the art of refrigerating through the agency of an absorption system including a generator, an absorber, an evaporator and connections forming a first cycle of circulation between the evaporator and absorber and a second cycle of circulation between the generator and absorber, said system including a fluid cooling agent, absorption liquid and a fluid auxiliary agent in the presence of which the cooling agent evaporates which consists in continuously generating force within the system, continuously and uniformly circulating said auxiliary agent in one direction through said first cycle due to said force, periodically generating a second force within the system and periodically moving absorption liquid within said second cycle due to said second force.

19. That improvement in the art of refrigerating through the agency of an absorption system including a generator, an absorber, an evaporator and connections forming a first cycle of circulation between the evaporator and absorber and a second cycle of circulation between the generator and absorber, said system including a fluid cooling agent, absorption liquid and a fluid auxiliary agent in the presence of which the cooling agent evaporates which consists in continuously generating force within the system, continuously and uniformly circulating said auxiliary agent in one direction through said first cycle due to said force, periodically generating a second force within the system, oscillating liquid in said second cycle under the influence of said second force, withdrawing absorption liquid from the absorber and forming the same into successive columns within said second cycle under influence of the oscillation of liquid and periodically moving said columns into the generator due to said second force.

20. Refrigerating apparatus comprising a generator, condensing means, an evaporator, an absorber, a vessel and means including connections between said vessel and the generator and absorber for periodically causing an excess of gas pressure in said vessel above the generator gas pressure, for withdrawing absorption liquid from the absorber, for periodically and successively producing liquid columns of the withdrawn absorption liquid, for periodically forcing said liquid columns into the generator and for periodically releasing the pressure in said vessel and equalizing the gas pressure in said generator and in said vessel.

21. Refrigerating apparatus comprising a generator, condensing means, an evaporator, an absorber, a vessel, a source of gas pressure operative to produce an excess of gas pressure above the generator gas pressure and means including connections between said source and said vessel, between said generator and said vessel and between said absorber and said vessel for periodically causing an excess of gas pressure above the generator gas pressure in said vessel, for withdrawing absorption liquid from the absorber, for periodically and successively producing liquid columns of the withdrawn absorption liquid, for periodically forcing said liquid columns into the generator and for periodically releasing the pressure in said vessel.

22. Refrigerating apparatus comprising a generator, a vessel, an upwardly extending conduit extending within said vessel and having a lower opening within said vessel and below the top thereof and having an upper opening in said generator at a higher level, an absorber, a conduit connecting said absorber with said vessel, a conduit connecting said generator with said absorber and means to produce a pressure in said vessel in excess of the generator gas pressure for causing liquid to flow from said vessel to the generator through said upwardly extending conduit.

23. Absorption refrigerating apparatus comprising a gas producing member, an absorber, a riser pipe, means to conduct absorption liquid from the absorber to the riser pipe, means to conduct gas from the gas producing member to the riser pipe, the arrangement being such that the gas conducted to the riser pipe carries with it the absorption liquid conducted to the riser pipe from the absorber upwardly through the riser pipe, means for receiving the gas and liquid conveyed upwardly through the riser pipe at a level above the gas producing member and for conveying liquid discharged from the riser pipe to the gas producing member and for conveying gas discharged from the riser pipe upwardly away from the liquid.

In testimony whereof we affix our signatures.

BALTZAR CARL von PLATEN.
CARL GEORG MUNTERS.